Figure 1:
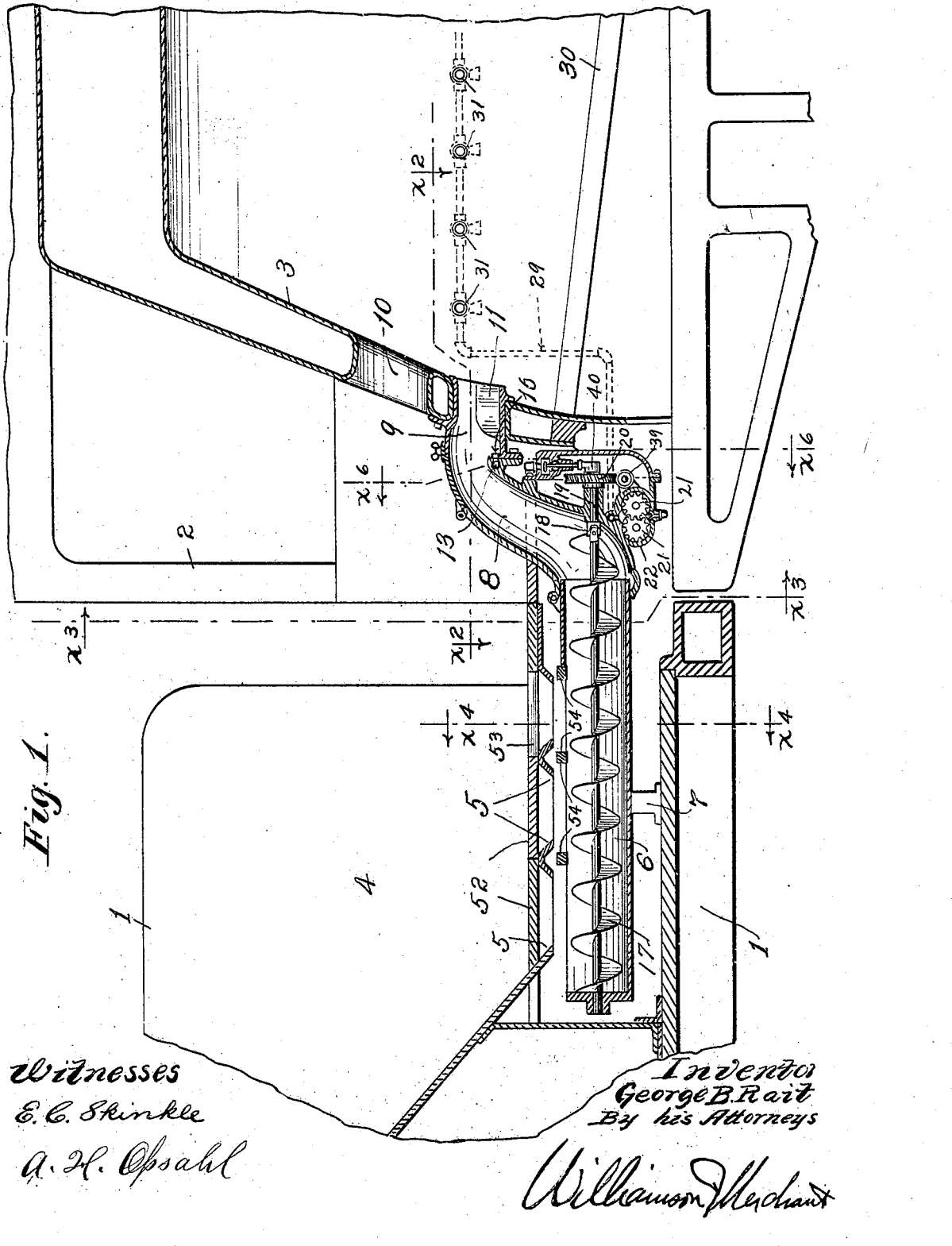

G. B. RAIT.
MECHANICAL STOKER.
APPLICATION FILED APR. 10, 1914.

1,149,685.

Patented Aug. 10, 1915.
6 SHEETS—SHEET 1.

Witnesses
E. C. Skinkle
A. H. Opsahl

Inventor
George B. Rait
By his Attorneys
Williamson Merchant

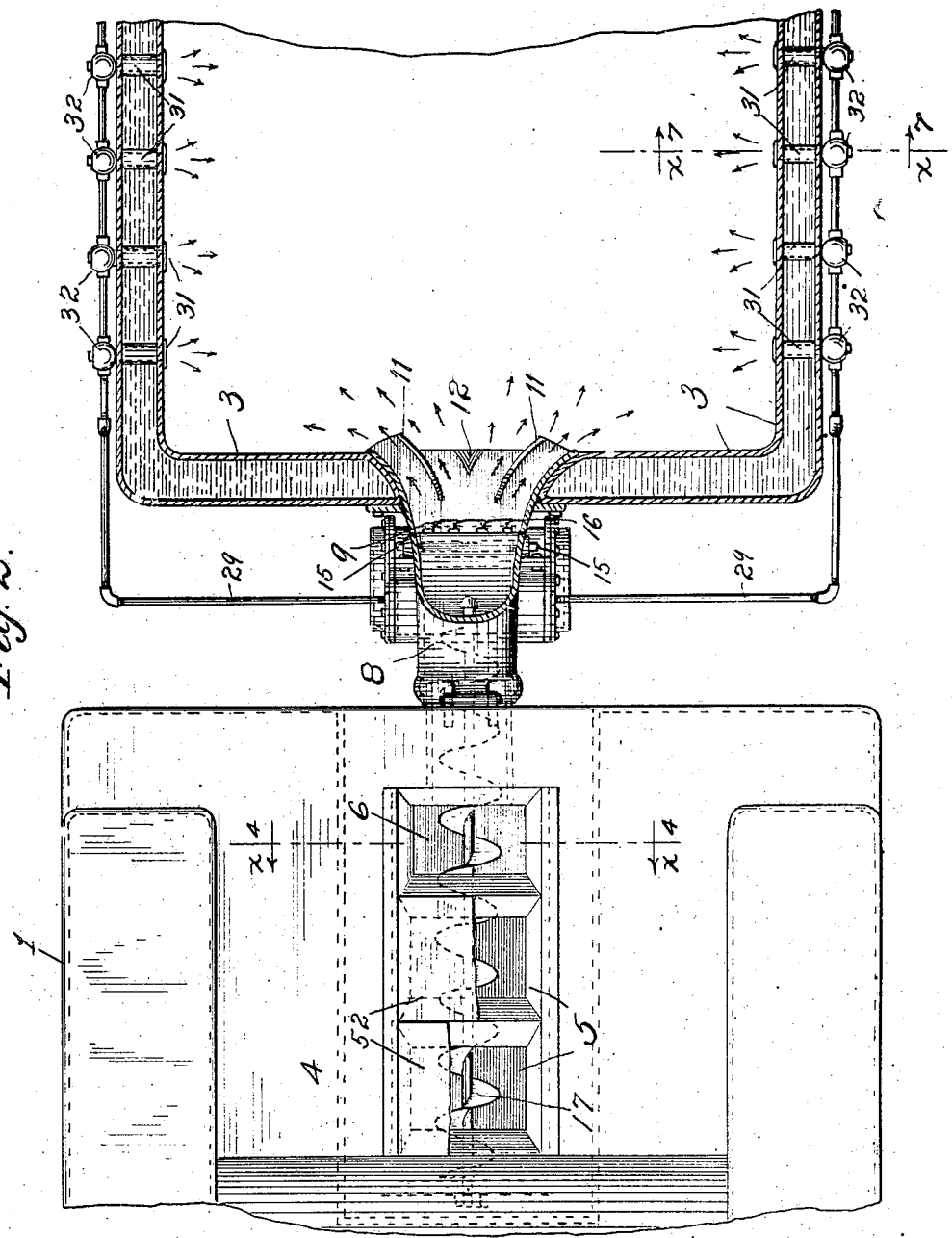

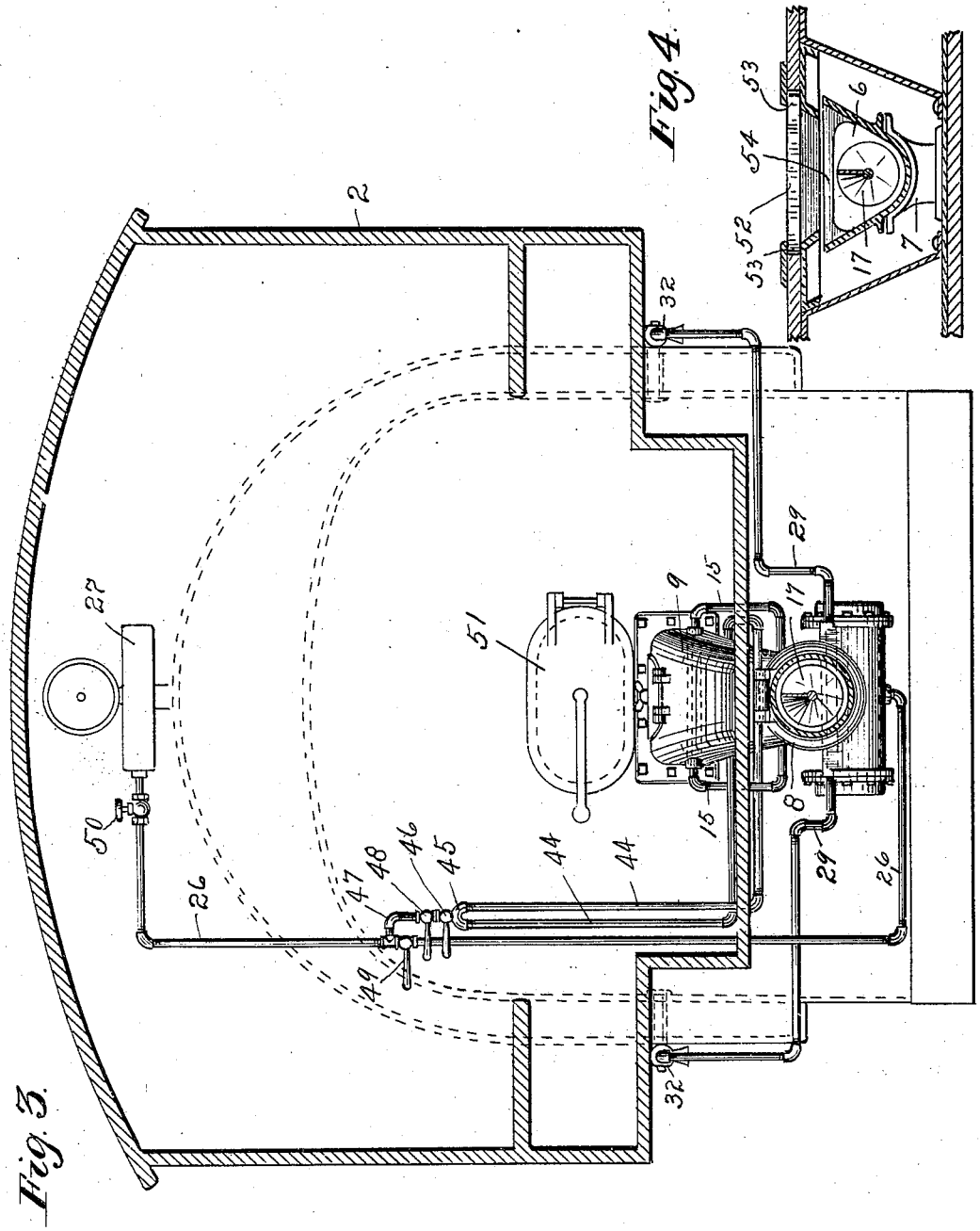

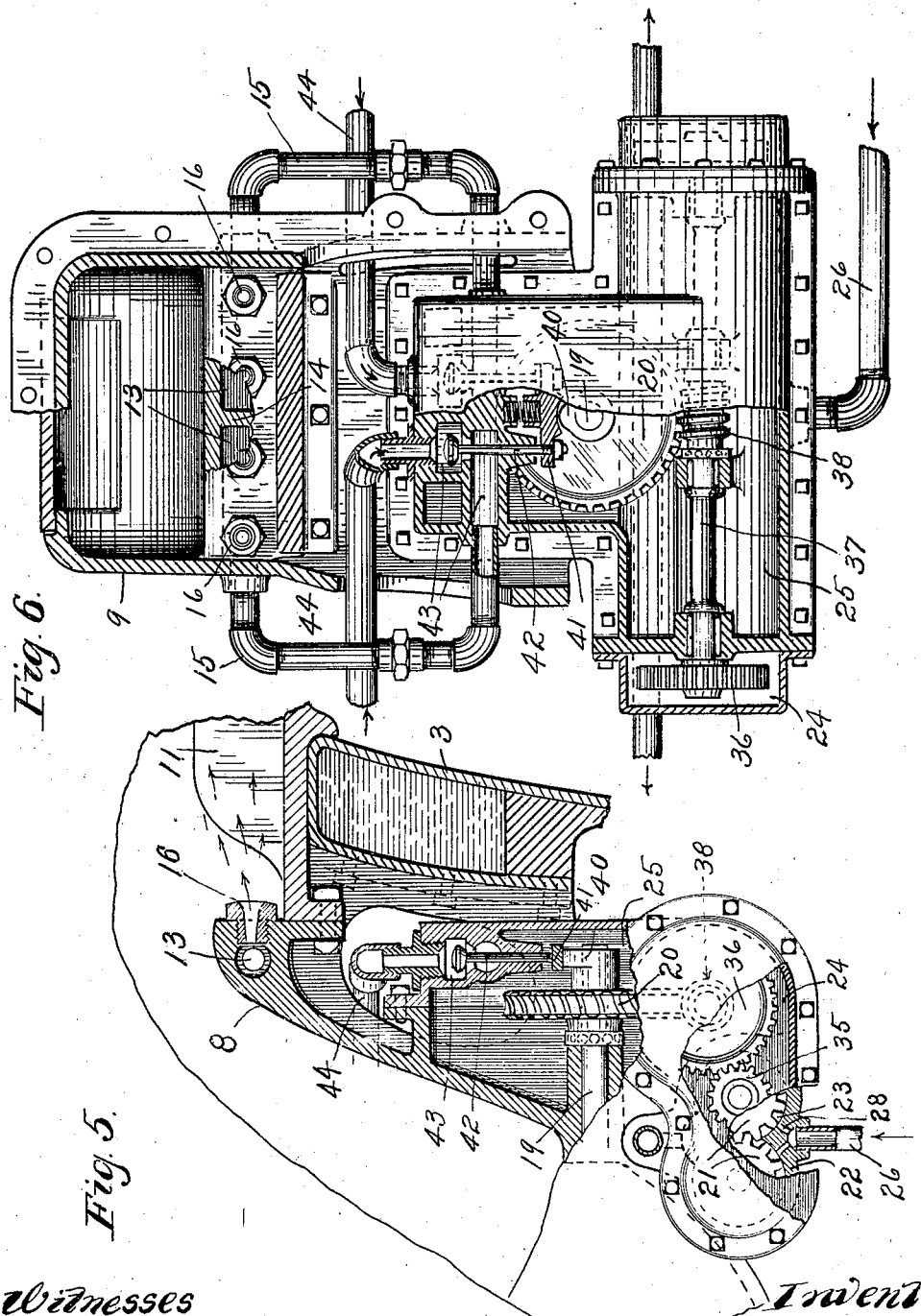

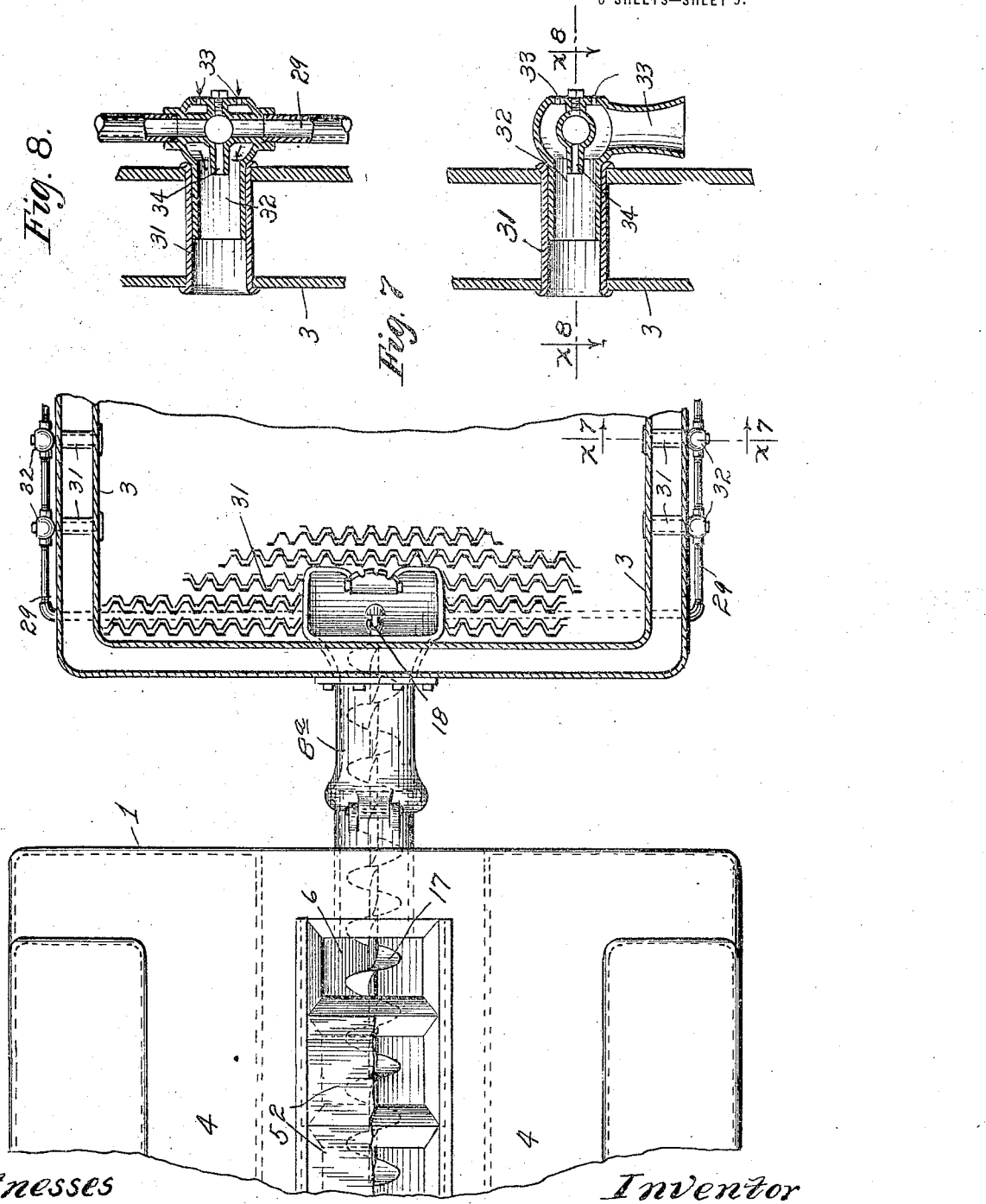

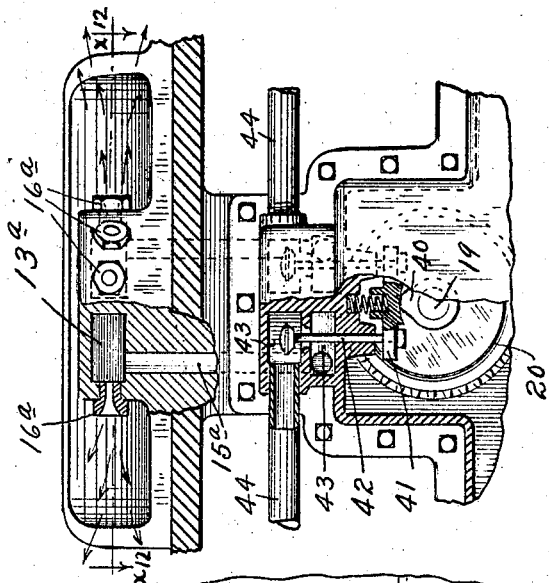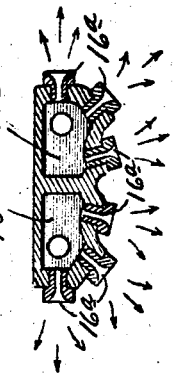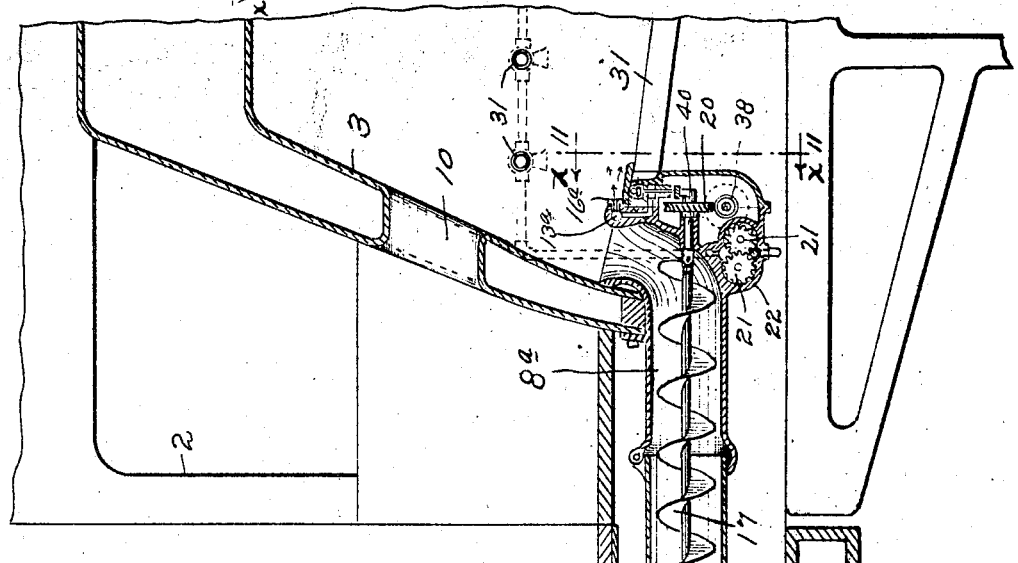

UNITED STATES PATENT OFFICE.

GEORGE B. RAIT, OF MINNEAPOLIS, MINNESOTA.

MECHANICAL STOKER.

1,149,685. Specification of Letters Patent. Patented Aug. 10, 1915.

Application filed April 10, 1914. Serial No. 830,878.

*To all whom it may concern:*

Be it known that I, GEORGE B. RAIT, a citizen of the United States, residing at Minneapolis, in the county of Hennepin and State of Minnesota, have invented certain new and useful Improvements in Mechanical Stokers; and I do hereby declare the following to be a full, clear, and exact description of the invention, such as will enable others skilled in the art to which it appertains to make and use the same.

My invention has for its object to provide an improved mechanical stoker, especially adapted for use in connection with locomotives, and to such ends, generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a vertical section taken centrally through the stoker and portions of the engine tender and firebox of the engine boiler; Fig. 2 shows the tender, in plan, of the locomotive firebox in horizontal section on the line $x^2$ $x^2$ on Fig. 1; some parts being broken away; Fig. 3 is a transverse vertical section taken approximately on the line $x^3$ $x^3$ on Fig. 1, and showing also the engine cab in vertical section; Fig. 4 is a detail in horizontal section taken on the line $x^4$ $x^4$ on Fig. 1; Fig. 5 is a view corresponding very much in the line of section to Fig. 1, but showing the parts on a larger scale, and with some parts shown in full and others broken away; Fig. 6 is a transverse vertical section taken approximately on the line $x^6$ $x^6$ on Fig. 1, but with some parts shown in full and some parts broken away; Fig. 7 is a detail in vertical section taken on the line $x^7$ $x^7$ on Fig. 2; Fig. 8 is a detail in horizontal section taken on the line $x^8$ $x^8$ on Fig. 7; Fig 9 is a view corresponding to Fig. 1, but illustrating a modified construction; Fig. 10 shows the engine tender in plan and the fire box of the boiler in horizontal section; Fig. 11 is a fragmentary view in transverse vertical section taken on the line $x^{11}$ $x^{11}$ on Fig. 9; and Fig. 12 shows one of the coal deploying nozzles in horizontal section on the line $x^{12}$ $x^{12}$ on Fig. 11.

In the accompanying drawings I have illustrated my invention embodied both in over-feed and underfeed types of stoker.

The over-feed construction is illustrated in Figs. 1 to 6, inclusive, and will first be described. The numerals 1, 2 and 3 indicate, respectively, the engine tender, the engine cab, and the walls of the firebox of a locomotive. The numeral 4 indicates the coal space or bunker of the engine tender and this is arranged to deliver from hopper passages 5 into a longitudinally extended feed hopper 6 that is loosely supported on a bearing bracket 7 secured on the bottom of the tender. The front end only of the feed hopper 6 is made cylindrical and is loosely telescoped into the receiving end of an upwardly and forwardly curved fuel feed spout 8, and preferably, is rigidly, but detachably secured by bolts, or otherwise, to a horizontally flaring delivery head 9 that is extended through a suitable opening formed in the rear wall or rear water leg of the fire box just below its door opening 10. The bottom plate of this feed head 9 is preferably flat, so that it affords a feed table, and is provided with laterally curved deflecting ribs 11, and preferably also, with a central deflecting lug or divider 12. The table or bottom plate of said feed head 9 is offset below the adjacent wall of the feed spout 8 at a point where it joins therewith, and the said feed spout is there formed with a transverse steam passage 13 (see particularly Figs. 1 to 5), that is centrally divided by a partition 14 (see Fig. 6). The outer extremities of the divided steam passages 13 are connected to steam blast pipes 15 that receive steam through valve-controlled chambers presently to be described. Each of the steam passages 13 deliver to one or more, as shown, each to two steam discharge nozzles 16 (see particularly, Figs. 2 and 5). These nozzles 16 have forwardly flaring axial passages and threaded shanks which latter are screwed into seats in the upwardly projecting portion of the adjacent wall of the feed spout 8. It may be here stated that the axial passages of the nozzle 16 are made flaring, so as to spread the blast of steam, and that the said nozzles may be made with different size bores and provided in sizes suitable for the particular size of fire box to which they are applied.

So far as the present invention is concerned, various different kinds of feed devices may be employed in the feed hopper 6. For example, I might employ a reciprocating feed bar such as that disclosed and claimed in my prior Patent No. 1,085,630, of date February 3rd, 1914, but I have shown, and preferably employ a heavy and very strong spiral conveyer or feed screw 17, the shaft of which, at its rear end, is journaled in the rear end of the said hopper, and at its forward end is connected, preferably by a knuckle joint 18 to the rear end of a short shaft 19 that is journaled in a sleeve-like bearing projected forward from the lower portion of the front wall of the feed spout 8.

In the present embodiment of my invention, I drive the spiral conveyer 17 from a small spiral toothed rotary turbine, such as that known to the trade as the "Spiro" and manufactured and sold by the Buffalo Forge Company. I do not, of course, limit myself to the use of this particular motor, but for the application thereof, I provide the short end of the front shaft 19 with a worm gear 20. Spiral rotors 21 of the said turbine work in a suitable casing 22 (see Figs. 1 to 5), which preferably, and as shown, are rigidly secured to the feed spout 8, and in addition to the steam chamber 23 in which the spirals 21 work, it is provided with gear chambers 24 and 25 (see Figs. 5 and 6).

Live steam from the boiler is used to operate the above described turbine, and such steam is delivered thereto through a steam supply pipe 26. This steam pipe 26 leads from a steam turret or header 27 that is in communication with the boiler and certain other devices not necessary to note. The delivery end of the steam pipe 26 (see Fig. 5) delivers live steam to the steam chamber 23 of the turbine, through small diverging ports 28. The said steam chamber 23 delivers the exhaust steam at opposite sides to exhaust pipes 29 (see Figs. 1, 2 and 3), and these exhaust pipes 29 lead to opposite sides of the fire box and will independently connect each to a plurality of combined air injectors that open through the sides of the fire box at points above the grate 30 and above the fire. These air injectors are shown in detail in Figs. 7 and 8, and as preferably constructed, they comprise short tubes 31 that extend through the laterally spaced walls of the fire box. Tubular air intake elbows 32 extend into the tubes 31 and, as shown, have depending open ends and auxiliary air intake ports 33. The exhaust pipes 29 extend through the elbows 32 and inside thereof, are provided with steam discharge nipples 34 that direct the steam axially through the tubes 31 and draw in the air through the elbows, so that a mixture of air and steam will be discharged into the firebox above the fire and will very greatly intensify the combustion and eliminate or very greatly reduce the smoke. While it is not broadly new to inject air and steam into a firebox, I believe, however, that it is broadly new first to utilize steam to operate a feed motor and then to utilize the exhaust steam from the said motor for the purpose above noted, and this feature I desire to broadly claim.

We will now describe the way in which the turbine above noted is utilized both to drive the spiral feed screw or conveyer 17 and to intermittently control the discharge of steam through the nozzles 16 for the purpose of spreading or deploying the coal over the grate or within the firebox. Directing attention first to Fig. 5, it will be noted that the shaft of one of the spiral toothed rotors 21 of the turbine is provided with a spur pinion 35 that meshes with a spur gear 36 secured on the counter shaft 37 (see Fig. 6) journaled in suitable bearings on the motor casing, and provided with a worm 38, which, in turn, meshes with the worm gear 20 secured on the front end of the supplemental shaft 19 of the spiral conveyer 17. By these connections, as is obvious, the feed screw or conveyer 17 will be continuously rotated whenever the turbine is in action, but of course, at a comparatively low speed. Here it may also be noted (see Figs. 5 and 6) that the hub of the worm gear 39 carries a cam 40 that engages a downwardly spring-pressed cross head 41.

The cross head 41 is connected to the depending ends of the stems of the valves 42 that normally close ports in independent or separated steam chambers 43 formed in the motor casing, as best shown in Figs. 5 and 6. The upper portions of these steam chambers 43 are connected to the delivery ends of steam pipes 44 that are connected to a three-way coupling 45 (see Fig. 3) that is equipped with a three-way valve 46 of well known construction. This coupling 45 is connected by a short pipe 47 to the steam pipe 26, but it might, nevertheless be independently connected to the boiler. Just above the three-way valve 46 and the pipe 47 is preferably also provided a cut-off valve 48, and the steam pipe 26 below the point where it is tapped by the pipe 47, is also preferably provided with a cut-off valve 49. It may be here noted that the steam pipe 26, as shown, is provided at its receiving end with a cut-off valve 50.

The lower portions of the two valve equipped steam chambers 43 are independently connected to the two steam delivery pipes 15 above noted, and which it will be remembered are independently connected to the two steam chambers 13, which chambers discharge through different pairs or members of the discharge nozzle 16. In Fig. 3 the numeral 51 indicates an ordinary fire box door applied to the door opening 10, already noted.

Referring particularly to Figs. 1 and 4, it will be noted that the hopper passages 5 are arranged to be opened and closed at will by cover plates 52 that are arranged to slide in guide-ways 53 formed in the sides of the bottom of the floor a of the coal bunker or space 4. The arrangement and operation of these cover plates is more fully set forth and broadly claimed in my prior patent, above identified, and hence, for the purpose of this case, it is only desirable to state that by sliding the cover plates forward, one after the other, as the coal is fed from the bunker, a supply opening into the feed hopper 6 may be always maintained at the proper point. Underlying the cross or transverse portions of the hopper passages 5 and rigidly secured on top of the hopper 6 are crushing bars 54 against which large lumps of coal will be forced and crushed by the action of the feed screw or spiral 17.

Operation: The operation summarized, is substantially as follows: The coal from the bunker 4 will fall by gravity through the open upper passage 5 into the hopper 6 where it will be taken up by the spiral conveyer 17 and positively forced forward and into the receiving end of the feed spout 8. By the crowding action of coal delivered into the lower end of said feed spout 8, the coal will be forced upward through the said spout and onto the table of the feed head 9, and in fact, the coal would be forced inward, into the firebox through the said feed head, solely by the said crowding action, were it not for another and very highly important action produced by the blast from the nozzle 16. Some of the coal may be simply crowded through the said feed head into the fire box, but the greater part thereof will be blown into the fire box and spread out or deployed therein by powerful intermittent steam blasts delivered through the nozzles 16, through the blast mechanism, already described, and which includes the intermittently opened valves 42. These valves 42 will be opened by the cam 40, once for each rotation of the spiral conveyer 17. Obviously, whenever the said valves 42 are opened, as shown in Fig. 6, live steam from the boiler will rush through the steam pipes 44, chambers 43 and pipes 15 and chambers 13, to the said nozzles 16, thereby producing violent puffs or steam blasts sufficient to blow the lumps of coal to any part of the firebox. The converging ribs 11 tend to spread the coal laterally within the firebox. The intensity of the blast produced when the said valves 42 are opened may be regulated by opening or closing more or less the valve 48 in the pipe section 47. By means of the three-way valve 46, the blast may be directed through both of the pipes 44, or through either one thereof, at will. In this way, the blast may be simultaneously delivered to both pairs of groups of nozzles 16, or it may be delivered solely to the nozzles on one side of the feed head. By these regulations of the blast, coal may, therefore, be delivered simultaneously to both sides of the firebox, or at will, it may be delivered to either one side thereof. In this way, therefore, coal may be delivered at any place in the firebox, so as to keep the fire properly built up and the coal properly distributed.

The steam turbine and hence, the spiral conveyer or feed screw 17, will be kept in action as long as the valve 49 is opened. In all of the above described operations, it is, of course, assumed that the valve 50 is opened. The said valve 50, when closed, will, in the arrangement described, cut off all supply of steam to the various steam operated devices above described. As long as the steam turbine is in action, coal will be delivered to the fire box, and when it is cut out of action, the supply of coal will be stopped. It of course follows that when the turbine is cut out of action and the feed of coal into the firebox stopped, the supply of steam and air through the injectors at the sides of the fire box will also be stopped. However, the supply of steam and air to increase combustion and reduce smoke is rendered available at the very time that coal is supplied to the fire box, and at which time the additional supply of air is required to support combustion and to prevent the escape of dense smoke and, consequently, waste of fuel. Otherwise stated, the supply of steam and air into the firebox from the injectors is automatic with the supply of fuel.

The underfeed structure illustrated in Figs. 9 and 10, 11 and 12, is identical with that above described with the following exceptions. The feed spout 8ª opens through the bottom of the firebox and terminates slightly above the grate 31 thereof, and has separated steam chambers 13ª that correspond to the chambers 13 and each of these chambers 13ª is provided with three forwardly converging steam discharge nozzles 16ª that are arranged to blow forwardly converging blasts of steam directly over the firebox grates. All of the other elements of this underfeed device are substantially identical with that of the overfeed device previously described, and hence, corresponding elements are indicated by like characters, so that they will be understood by the reading of the description of said overfeed device.

What I claim is:

1. The combination with a boiler having a fire box, of a mechanical stoker comprising a fuel feed device delivering into said fire box, a steam motor with connections for operating said feed device, the said motor having connections for delivering live steam thereto from said boiler and having exhaust connections, including air intake devices, for delivering commingled exhaust steam and air into said fire box, the delivery of the fuel and exhaust steam and air into said fire box being timed in respect to each other by the operation of said motor.

2. The combination with a boiler having a firebox, of a mechanical stoker comprising a fuel feed device delivering into said firebox, a steam actuated motor for operating said feed device, said motor having connections for supplying the same with steam from said boiler, and having duplex exhaust connections directing the exhaust steam into the opposite sides of the firebox, the said exhaust connections including air intake devices for delivering air commingled with the exhaust steam into the said firebox.

3. The combination with a boiler having a firebox, of a mechanical stoker comprising a fuel feed device delivering into said firebox, and a steam turbine with connections for operating said feed device, said turbine having connections for delivering live steam thereto from said boiler, and having exhaust connections for directing the exhaust steam into said firebox, said exhaust connections including air intake devices whereby commingled air and exhaust steam will be introduced into said fire box.

4. The combination with a boiler having a fire box, of a mechanical stoker comprising a fuel feed device delivering into said fire box, a steam motor with connections for operating said feed device, said motor having connections for delivering live steam thereto from said boiler and having exhaust connections for directing the exhaust steam therefrom into said fire box, a live steam delivery nozzle located at the place of delivery of the fuel into said fire box, and live steam delivery connection from said boiler to said live steam delivery nozzle, including a valve operated by said motor, whereby the delivery of fuel, and of live steam and exhaust pulsations into said fire box, are timed in respect to each other.

5. The combination with a boiler having a fire box, of a mechanical stoker comprising a fuel feed device delivering into said fire box, a steam motor with connections for operating said feed device, the said motor having connections for delivering live steam thereto from said boiler and having exhaust connections for directing the exhaust steam therefrom into said fire box, opposed live steam blast delivering nozzles located at the place of delivery of the fuel into said fire box, and a live steam delivery connection from said boiler to said nozzles, including a valve operated by said motor, whereby the delivery of fuel, and of the live steam and exhaust pulsations into the said fire box are timed in respect to each other.

6. The combination with a boiler having a fire box, of a mechanical stoker comprising a fuel feed device delivering into said fire box, a steam motor with connections for operating said feed device, said motor having connections for delivering live steam thereto from said boiler and having duplex exhaust connections, including air intake devices, for delivering commingled exhaust steam and air into said fire box, live steam blast delivery nozzles located at the place of delivery of fuel into said fire box, and live steam delivery connections from said boiler to said blast nozzles, including valves operated by said motor, whereby the delivery of fuel and of the live steam and exhaust pulsations into said fire box are timed in respect to each other.

7. The combination with a fire box, of a mechanical stoker for deliverying fuel into said fire box, opposed blast delivery nozzles located at the place of delivery of the fuel into said fire box and arranged for delivery of the fuel to opposite sides of the fire box, a three-way valve, a steam supply pipe leading from said boiler to said three-way valve, and branch pipes leading from said three-way valve to said opposed nozzles, whereby, by manipulation of said three-way valve, the said opposed nozzles may be thrown into action simultaneously, or at different times.

8. The combination with a firebox, of a mechanical stoker for delivering fuel into said firebox, blast delivering nozzles located at the place of delivery of the fuel into said firebox and arranged in two groups for delivering of fuel to opposite sides of the firebox, a three-way valve, a steam supply pipe leading from the boiler to said three-way valve, and branch pipes leading from said three-way valve to the two groups of nozzles, whereby, by manipulation of the three-way valve, the said two groups of nozzles may be thrown into action separately, or both groups simultaneously.

9. The combination with a firebox, of a mechanical stoker for delivering fuel into said firebox, blast delivering nozzles located at the place of delivery of the fuel into said firebox, and arranged in two groups for delivery of fuel to opposite sides of said firebox, a three-way valve, a steam supply pipe leading to said three-way valve, a cut-off valve in said steam supply pipe for regulating the pressure of said steam supply for blast purposes, and branch pipes leading from said three-way valve to the two groups of nozzles whereby by manipulation of said three-way valve the said two groups of nozzles may be thrown into action separately, or both groups simultaneously.

10. The combination with a firebox, of a mechanical stoker for delivering fuel into said firebox, blast delivering nozzles located at the place of delivery of the fuel into said firebox and arranged in two groups for delivery of fuel to opposite sides of said firebox, a three-way valve, a steam supply pipe leading to said three-way valve, and branch pipes leading from said three-way valve to the two groups of nozzles for blast purposes whereby by manipulation of said three-way valve, each side of the firebox may be fired separately, or both sides simultaneously.

11. The combination with a firebox, of a mechanical stoker for delivering fuel into said firebox, blast delivering nozzles located at the place of delivery of the fuel into said firebox and arranged in two groups for delivery of fuel to opposite sides of said firebox, blast delivering valves leading into said blast nozzles, said blast delivering valves being actuated by a cam on the forward end of the main shaft of the spiral conveyer, a three-way valve, a steam supply pipe leading to said three-way valve, and branch pipes connecting said three-way valve and said blast delivering valves and nozzles, whereby by manipulation of said three-way valve, the said two groups of blast delivering valves and nozzles may be thrown into action separately or both groups simultaneously.

12. The combination with a firebox, of a mechanical stoker for delivering fuel into said firebox, blast delivering valves and nozzles located at the place of delivery of the fuel into said firebox, and arranged in two groups for delivering fuel to opposite sides of said firebox, said blast delivering valves being actuated by a cam on the front end of the main shaft of the spiral conveyer, a three-way valve, a steam supply pipe leading to said three-way valve, and branch pipes connecting said three-way valve and said blast delivering valves and nozzles, whereby, by manipulating said three-way valve, each side of the firebox may be fired separately or both sides simultaneously.

In testimony whereof I affix my signature in presence of two witnesses.

GEORGE B. RAIT.

Witnesses:
  ERA E. KÖNIG,
  HARRY D. KILGORE.